(12) United States Patent
Roseman et al.

(10) Patent No.: US 10,578,221 B2
(45) Date of Patent: Mar. 3, 2020

(54) FLOW DIVIDER

(71) Applicant: Precision Planting LLC, Tremont, IL (US)

(72) Inventors: Chris Roseman, Tremont, IL (US); Jason Stoller, Eureka, IL (US); Todd Swanson, Tremont, IL (US); Ian Radtke, Washington, IL (US)

(73) Assignee: Precision Planting LLC, Tremont, IL (US)

( * ) Notice: Subject to any disclaimer, the term of this patent is extended or adjusted under 35 U.S.C. 154(b) by 0 days.

(21) Appl. No.: 15/730,196

(22) Filed: Oct. 11, 2017

(65) Prior Publication Data

US 2018/0100594 A1  Apr. 12, 2018

Related U.S. Application Data

(60) Provisional application No. 62/406,837, filed on Oct. 11, 2016.

(51) Int. Cl.
| | | |
|---|---|---|
| *F16K 11/07* | (2006.01) | |
| *F16K 11/02* | (2006.01) | |
| *F15B 13/02* | (2006.01) | |

(52) U.S. Cl.
CPC ........ *F16K 11/0712* (2013.01); *F15B 13/022* (2013.01); *F16K 11/022* (2013.01); *Y10T 137/2524* (2015.04); *Y10T 137/2652* (2015.04); *Y10T 137/2657* (2015.04); *Y10T 137/2688* (2015.04)

(58) Field of Classification Search
CPC ............... F15B 13/022; F16K 11/0222; F16K 11/0712; Y10T 137/2524; Y10T 137/2652; Y10T 137/2657; Y10T 137/2663; Y10T 137/2668; Y10T 137/2688; Y10T 137/2693
USPC .... 137/101, 118.02, 118.04, 118.06, 119.01, 137/119.06, 119.08
See application file for complete search history.

(56) References Cited

U.S. PATENT DOCUMENTS

| | | | | |
|---|---|---|---|---|
| 2,242,002 A | * | 5/1941 | Klein ...................... | F15B 11/22 137/101 |
| 2,266,921 A | * | 12/1941 | Trautman ................ | B64C 25/22 137/101 |
| 2,386,291 A | * | 10/1945 | Browne ................... | F01P 11/08 137/101 |
| 2,593,185 A | * | 4/1952 | Renick .................... | F15B 11/22 137/101 |
| 2,643,664 A | * | 6/1953 | Willett ................... | F15B 13/022 137/101 |

(Continued)

*Primary Examiner* — William M McCalister
(74) *Attorney, Agent, or Firm* — Jaffery Watson Mendonsa & Hamilton LLP

(57) ABSTRACT

Described herein is a flow divider that has two chambers defined by two diaphragms and a spool disposed through the diaphragms. The spool has two tapered nozzles that extend into outlets from each chamber. Within the spool are orifices for providing fluid communication from an inlet to each chamber and dividing the flow. The flow divider generally maintains consistent flow to each outlet even when there is downstream backpressure by being able to move away from the outlet with the increased pressure to further drive the opposite nozzle into the other outlet to reduce the flow at the other outlet to balance the pressure at each outlet.

23 Claims, 3 Drawing Sheets

(56) References Cited

U.S. PATENT DOCUMENTS

| | | | | |
|---|---|---|---|---|
| 2,971,522 A * | 2/1961 | Lewis | F15B 13/022 | 137/101 |
| 3,010,469 A * | 11/1961 | Leighton | B60T 11/326 | 137/118.03 |
| 3,021,859 A * | 2/1962 | Liantonio | F16J 3/02 | 137/101 |
| 3,148,364 A * | 9/1964 | Engels | B60T 11/326 | 137/118.06 |
| 3,149,475 A * | 9/1964 | Gislason | F25B 49/027 | 137/118.06 |
| 3,273,582 A * | 9/1966 | Valentine | B60T 11/326 | 137/111 |
| 3,348,563 A * | 10/1967 | Sidles, Jr. | F15B 13/022 | 137/100 |
| 3,370,602 A * | 2/1968 | Nelson | F15B 13/022 | 137/101 |
| 3,437,103 A | 4/1969 | Yoshino | | |
| 3,543,783 A * | 12/1970 | Ifield | F15B 13/022 | 137/101 |
| 3,554,213 A * | 1/1971 | Yoshino | F15B 13/022 | 137/101 |
| 3,590,844 A * | 7/1971 | Ladenzon | F15B 13/022 | 137/101 |
| 3,604,460 A * | 9/1971 | Delrue | B02C 2/045 | 137/112 |
| 3,674,047 A * | 7/1972 | Tauger | F15B 13/022 | 137/101 |
| 3,682,199 A * | 8/1972 | Bader | F15B 3/00 | 137/625.48 |
| 3,722,524 A * | 3/1973 | Engelmann | G05D 11/003 | 137/101 |
| 3,729,014 A | 4/1973 | Narumi | | |
| 3,807,426 A * | 4/1974 | Henes | F15C 3/04 | 137/100 |
| 3,823,556 A * | 7/1974 | Goto | F01N 3/2053 | 137/118.06 |
| 3,924,650 A * | 12/1975 | Parquet | F15B 13/022 | 137/101 |
| 3,973,580 A | 8/1976 | Ueda | | |
| 4,121,601 A * | 10/1978 | Presley | B60K 17/10 | 137/101 |
| 4,181,154 A * | 1/1980 | Oley | F16K 11/048 | 137/863 |
| 4,193,418 A * | 3/1980 | Meyer | F16K 17/0473 | 137/118.01 |
| 4,204,554 A * | 5/1980 | Taig | F15B 13/022 | 137/101 |
| 4,250,909 A * | 2/1981 | Adams | B62D 5/08 | 137/101 |
| 4,666,166 A * | 5/1987 | Hart | F04B 43/0054 | 137/510 |
| 4,691,730 A | 9/1987 | Portolese et al. | | |
| 4,807,657 A * | 2/1989 | Van Den Bergh | F17C 13/02 | 137/101 |
| 4,877,057 A * | 10/1989 | Christensen | A62C 5/02 | 137/625.48 |
| 4,917,148 A * | 4/1990 | Tamamori | B60T 8/1825 | 137/596.18 |
| 5,096,266 A * | 3/1992 | Skantar | B60T 13/665 | 137/494 |
| 5,165,233 A * | 11/1992 | Betz | F15B 11/162 | 137/101 |
| 6,289,917 B1 | 9/2001 | Gerstenberger | | |
| 6,837,047 B2 * | 1/2005 | Dong | F16H 61/4043 | 137/114 |
| 2008/0276993 A1 | 11/2008 | Matsuzaki et al. | | |

\* cited by examiner

FLOW DIVIDER

RELATED APPLICATIONS

This application claims the benefit of U.S. Provisional Application No. 62/406,837, filed on Oct. 11, 2016, the entire contents of which are hereby incorporated by reference.

TECHNICAL FIELD

Embodiments of the present disclosure relate to flow dividers.

BACKGROUND

Flow dividers are generally used in hydraulic systems to maintain a consistent pressure between two flows that are split from one flow. These flow dividers are generally precision machined parts with a body having an inlet and two outlets. In the body, there is a spool that has inlets in fluid communication with the inlet leading to an inlet chamber in the spool. From the inlet chamber, there are two orifices that allow flow to two outlet chambers in the spool that have outlets in fluid communication with the two outlets. Since hydraulic fluids generally lubricate, the spool is able to slide within the body in response to pressure differences to shift the flow from one outlet to the other.

BRIEF DESCRIPTION OF THE DRAWINGS

The present disclosure is illustrated by way of example, and not by way of limitation, in the figures of the accompanying drawings and in which.

BRIEF SUMMARY

Described herein is a flow divider that can divide fluid flows and maintain proportional flow by balancing the pressure.

DETAILED DESCRIPTION

All references cited herein are hereby incorporated by reference in their entireties. In the event of a conflict in a definition in the present disclosure and that of a cited reference, the present disclosure controls.

Described herein are flow dividers, which can be used for non-hydraulic fluids to maintain a consistent division of flow. It would be desirable to have a flow divider for non-hydraulic fluids, which can be non-lubricating or have lower viscosity, or which can maintain a consistent division of flow.

Figure 1:
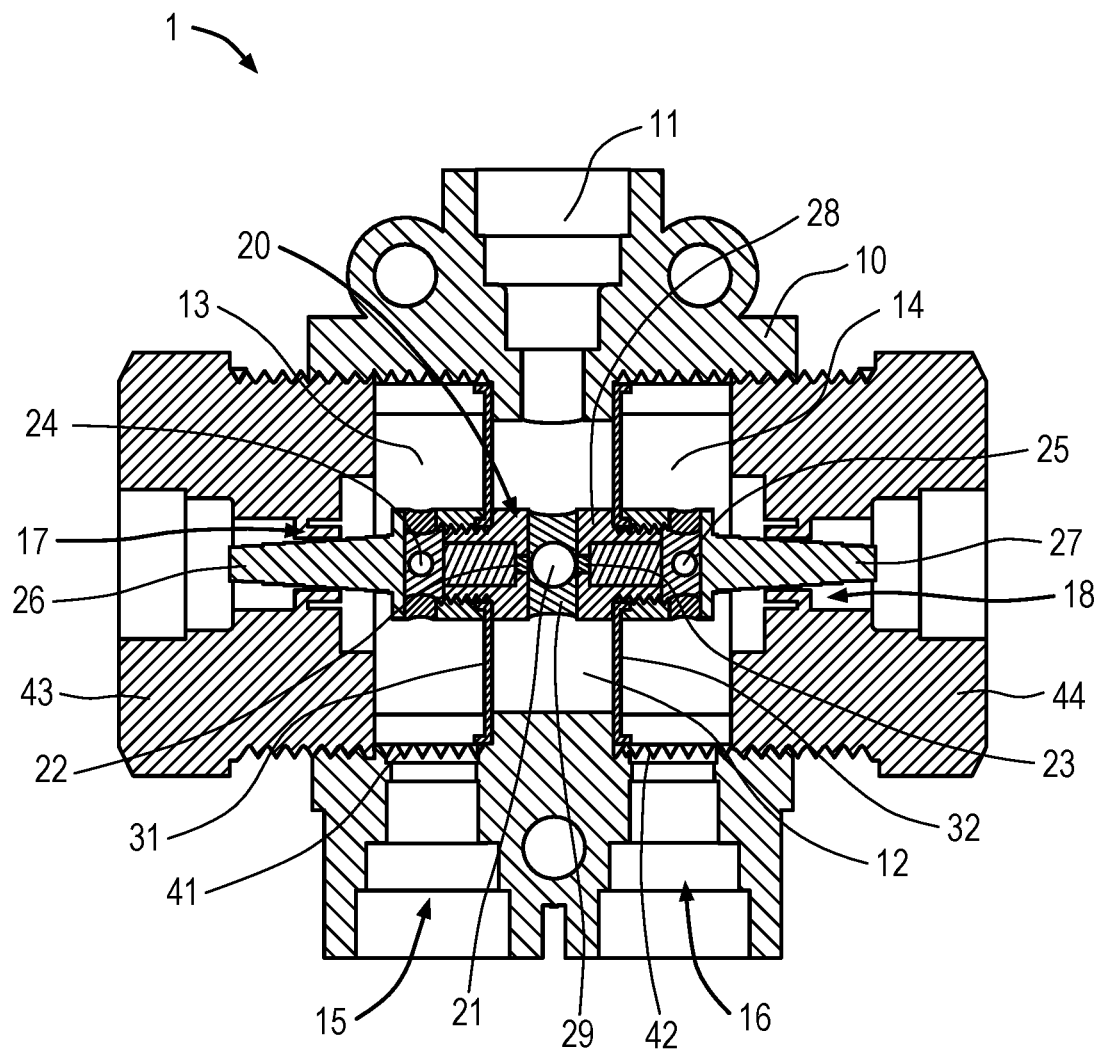
FIG. 1 shows a cross-sectional view of a flow divider in accordance with one embodiment.

In FIG. 1, a flow divider 1 has a body 10 that has an inlet 11 that is in fluid communication with central chamber 12 in accordance with one embodiment. A first diaphragm 31 separates central chamber 12 from a first chamber 13, and a second diaphragm 32 separates central chamber 12 from a second chamber 14. A spool 20 is disposed through first diaphragm 31 and second diaphragm 32 providing fluid communication between central chamber 12 and first chamber 13 and second chamber 14. Spool 20 has a central portion 28 that is in central chamber 12 and has one or more spool inlets 21. Spool inlets 21 are in fluid communication with a central cavity 29 within central portion 28. Central cavity 29 is in fluid communication with first chamber 13 through a first orifice 22 leading to one or more first spool outlets 24, and central cavity 29 is in fluid communication with second chamber 14 through a second orifice 23 leading to one or more second spool outlets 25.

Defining first chamber 13 is first diaphragm 31 and a first cap 43 disposed in body 10. Defining second chamber 14 is second diaphragm 32 and a second cap 44 disposed in body 10. In another embodiment, to better control the size of first chamber 13 and second chamber 14, spacers 41 and 42 can be disposed between first cap 43 and first diaphragm 31 and second cap 44 and second diaphragm 32, respectively. Disposed through first cap 43 is first outlet 17, which is in fluid communication with first chamber 13. Disposed through second cap 44 is second outlet 18, which is in fluid communication with second chamber 14.

Spool 20 has a first nozzle 26 that extends into first outlet 17 and a second nozzle that extends into second outlet 18. First nozzle 26 and second nozzle 28 are tapered to reduce in size from spool 20 towards first outlet 17 and second outlet 18, respectively.

Figure 2:
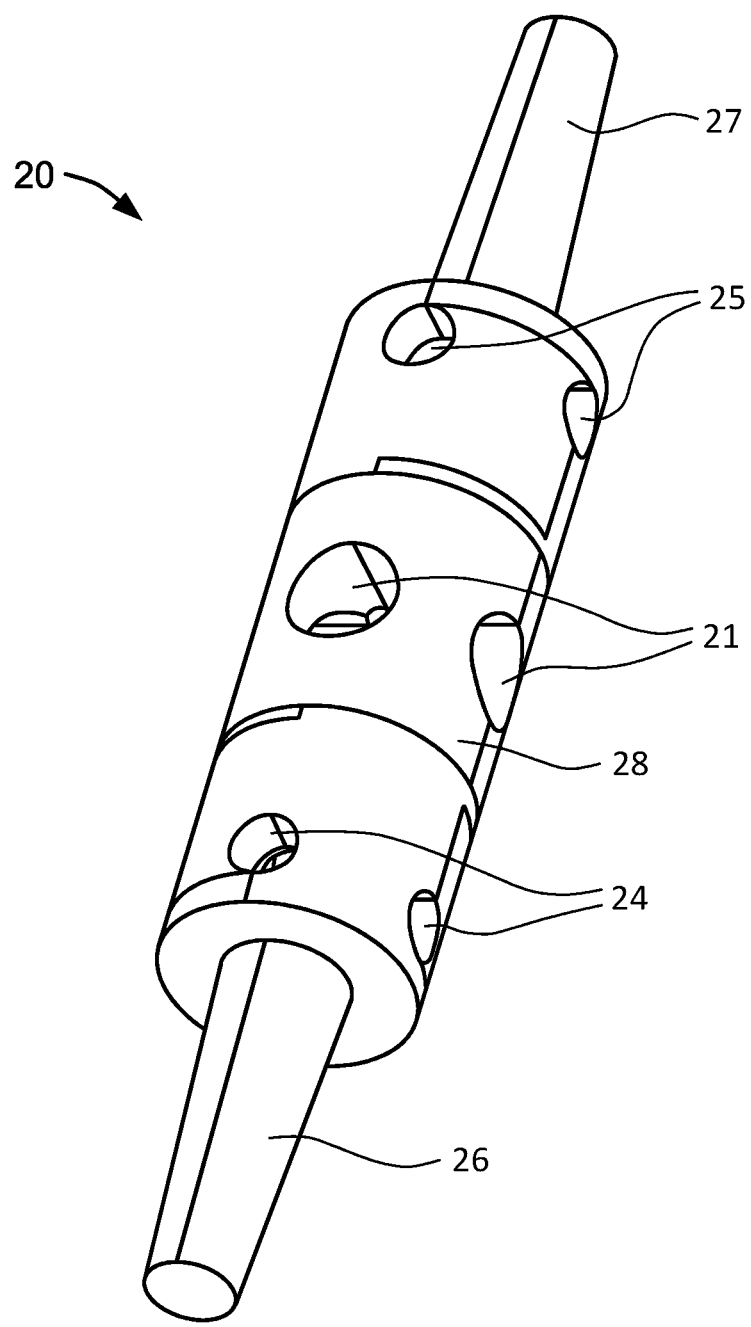
FIG. 2 is a perspective view of the spool in accordance with one embodiment.

FIG. 2 is a perspective view of spool 20 showing central portion 28 with spool inlets 21, first spool outlets 24, first nozzle 26, second spool outlets 25, and second nozzle 27 in accordance with one embodiment. For spool inlets 21, first spool outlets 24 and second spool outlets 25, there can be one or more inlets/outlets. In one embodiment, there are four inlets/outlets disposed radially around spool 20 that are offset 90 degrees from each other.

For ease of assembly, spool 20 can be three parts with central spool portion 28 disposed in the central chamber 12 and extending through diaphragms 31 and 32 to connect to first nozzle 26 and second nozzle 27, respectively.

Optionally, there can be a first pressure measurement port 15 disposed in body 10 in pressure communication with first chamber 13, and a second pressure measurement port 16 disposed in body 10 in pressure communication with second chamber 14.

Figure 3:
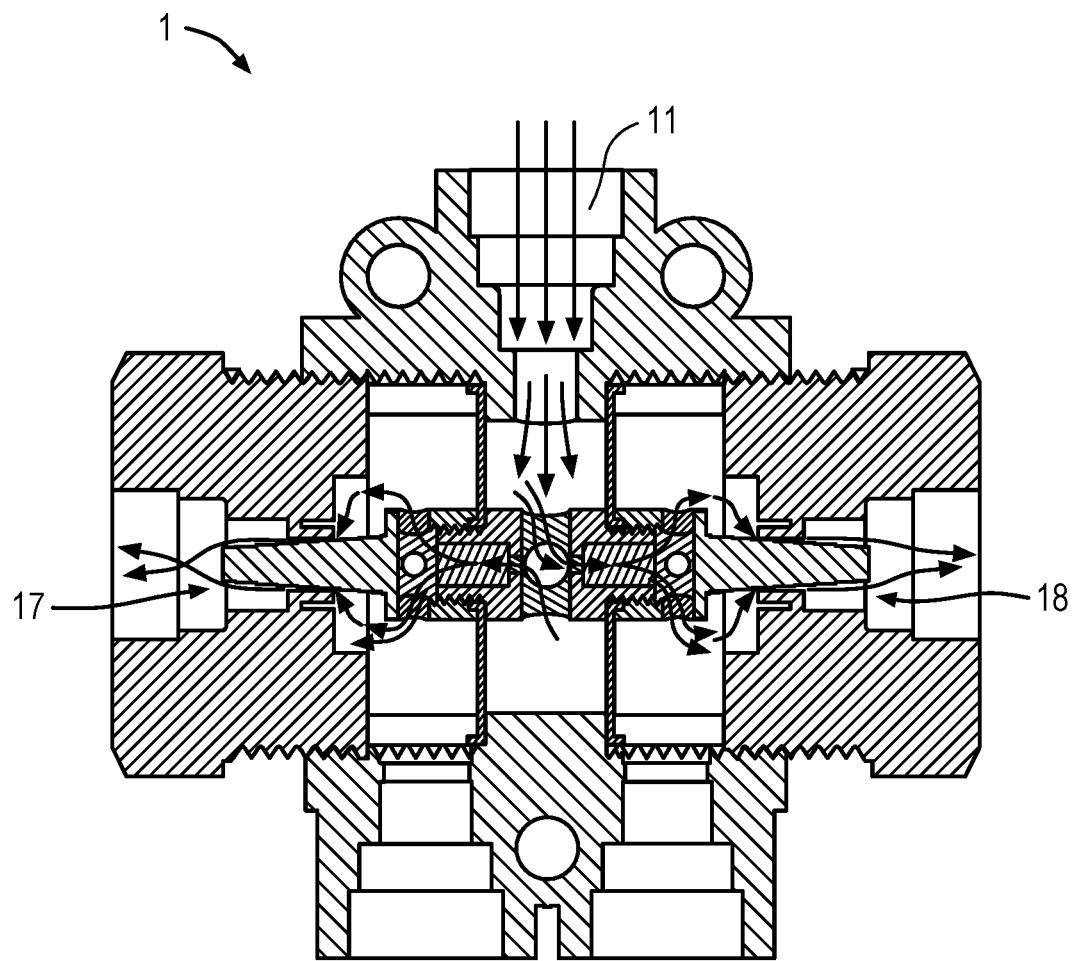
FIG. 3 shows fluid flows through the flow divider in accordance with one embodiment.

FIG. 3 is a cross-sectional view of flow divider 1 with arrows showing the flow of fluid from inlet 11 to first outlet 17 and second outlet 18 in accordance with one embodiment.

The division of flow between the outlets can be any selected division from 50/50 to less than 100% and greater than 0%. To change the percentage of flow, the area of first orifice 21 and second orifice 22 is changed. Generally, the percentage of the area at each orifice 21 and 22 based on a total area of orifices 21 and 22 is the percentage of flow. For example, if the areas are equal, then the flow is 50/50. If the area of one of orifices 21 and 22 is ⅓ of the total area, then the flow will be divided approximately ⅓ and ⅔. While this is a general estimate, actual sizing can be determined based on actual testing based on selected fluids.

The flow divider 1 can maintain the division of flow even when there is backpressure downstream of flow divider 1. For example, if first orifice 21 is sized for ⅓ flow and second orifice is sized for ⅔ flow of the inlet flow, and if there is backpressure created downstream of second outlet 18, that backpressure is communicated through second outlet 18 into second chamber 14. This causes second diaphragm 32 to flex toward central chamber 12 thus moving spool 20 towards first chamber 13. This then causes first nozzle 26 to move further into first outlet 17 and reducing a cross-sectional area of first outlet 17. This then creates additional pressure in first chamber 13, which will continue until the pressure in first chamber 13 is equalized with the pressure in second chamber 14. This keeps the amount of flow to the same proportion even when there is backpressure.

Backpressure can be created when there is an obstruction downstream of flow divider 1. This can happen when the downstream flow is blocked with material flowing through divider 1 or from foreign material entering the downstream flow. In one example, if the downstream flow is to a spray nozzle that is in contact with the ground, soil can enter the spray nozzle and create an obstruction.

Spool 20 moves within flow divider 1 without the need for contact with body 10 as is done in hydraulic flow dividers. No lubrication is necessary for spool 20 to move. This allows fluids that have adhesive properties to be used because the spool 20 is not in contact with body 10. The flow divider design can also work with a wider range of fluid viscosities (e.g., 0.1-2 gallons per minute) as compared to hydraulic flow dividers. While hydraulic flow dividers are designed for high pressures such as about 3000 psi, the present flow divider can be designed for any pressure greater than 0 up to the pressure rating of the diaphragms (e.g., up to approximately 70 psi). Also, low flow rates can be used from greater than 0 flow up to the maximum flow of the inlet.

The present design uses a valve design to suspend the spool with diaphragms instead of putting it in a sliding configuration. Hydraulic spool flow dividers use a spool that moves over sliding contact. No other flow dividers use diaphragms because the diaphragms are too weak for high pressure applications. The sliding contacts in hydraulic valves require extremely high precision manufacturing. Also, the hydraulic fluid itself can act as a lubricant for these sliding contacts. Sliding contacts are advantageous for hydraulic applications because they allow for a lot of free movement. However, for the desired non-hydraulic application, design challenges such as lower flow rates, low pressures, corrosive fluid with sticky precipitate, and less viscous fluid factor into not using sliding contacts. In one example, a valve for a fertilizer application is desired to have mostly plastic injection molded parts which can get expensive when high precision tolerances are needed. The fertilizer has a high salt content and leaves a significant amount of precipitate that could cause a sliding spool to stick and get stuck. The use of diaphragms to hold the spool is advantageous for this application for several reasons. First, no sliding contacts are required for the spool to move which prevents mechanical sticking. Second, manufacturing tolerances can be much less precise, thus reducing cost. Third, lower pressures in this non-hydraulic application mean that diaphragms can perform reliably without bursting. Fourth, diaphragms also increase the available surface area for pressure differential to act, increasing the force acting to move the spool.

However, a few design challenges occur with using diaphragms. The main problem is the restriction of movement. Diaphragms have a small range in which to move freely. When the diaphragms reach the limit of that range, the spring rate of the rubber increases drastically and is difficult to predict and design around. Another problem is the need to create strong seals on the edge of the diaphragms. The final hurdle with diaphragms is that when tightening down on the diaphragms to create a seal, the diaphragms often twist or create a concavity in the rubber causing it to snap from one extreme position to the next position. The current design addresses these issues. To overcome the issue of limited travel, the size of the valve was increased fairly significantly. This allows for much large diaphragms which can move larger distances freely. Also, a thin diaphragm with a low durometer rating was used in one example. In one embodiment, the present design uses a Nitrile Rubber diaphragm that is 1/64 inch thick and has a durometer rating of 30 D.

To create a strong seal on the diaphragm, screw connections on the spool and caps pinch the edges of the diaphragms. Plastic washers/spacers are placed in between the screw pieces and the diaphragm in order to prevent diaphragm twisting. The edges of the washers were sharpened slightly to better pinch the diaphragm. The inner seal around the spool was more difficult to maintain because the pieces were smaller, more fragile, and diaphragm hole needed to be slightly more precise. When this valve is manufactured, the sealing, twisting, and concavity problems can be reduced or eliminated. Over molding will allow the diaphragm to be permanently connected to the spool, creating a strong seal with no screw on parts preventing twisting and concavity.

In other embodiments, rolling diaphragms can be used for seals pistons. The rolling diaphragms are able to roll with little to no resistance. The rolling diaphragms do not change the amount of surface are on with pressure acts. Some type of bellows would also allow for more movement with little to no resistance.

The valve of the present design provides an ability to increase pressure in a branch that has a restriction. This would be useful in lines that are expected to have debris that could clog the lines. As a line is clogged, the spool directs the inlet pressure from the pump to the branch that has a restriction.

What is claimed is:

1. A flow divider comprising:
   a body having an inlet to a central chamber in the body;
   a first diaphragm separating the central chamber from a first chamber;
   a second diaphragm separating the central chamber from a second chamber; and
   a spool disposed in the central chamber and extending through the first diaphragm and the second diaphragm, the spool having an inlet and a first orifice for fluid communication to the first chamber and a second orifice for fluid communication to the second chamber, wherein the inlet of the spool is in fluid communication with the first orifice and the second orifice such that the inlet is in fluid communication with the first chamber and the second chamber, wherein the first diaphragm forms the first chamber and the second diaphragm forms the second chamber wherein the spool has a first tapered nozzle that reduces in size from a central portion of the spool into a first outlet of the flow divider.

2. The flow divider of claim 1, wherein the inlet of the spool comprises a plurality of inlets equally spaced from each other.

3. The flow divider of claim 1, wherein the spool comprises a central cavity that is in fluid communication with first chamber through the first orifice leading to one or more first spool outlets, and the central cavity is in fluid communication with the second chamber through the second orifice leading to one or more second spool outlets.

4. The flow divider of claim 3, wherein the one or more first spool outlets are in fluid communication with the first outlet of the flow divider based on fluid flow outside of the first tapered nozzle and the one or more second spool outlets are in fluid communication with a second outlet of the flow divider based on fluid flow outside of a second tapered nozzle.

5. The flow divider of claim 1, wherein the spool is suspended with the first and second diaphragms and designed to move within the flow divider without contacting the body.

6. The flow divider of claim 1, wherein the flow divider is designed to operate with a range of fluid viscosities of 0.1 to 2 gallons per minute.

7. The flow divider of claim 1, wherein the flow divider comprises a non-hydraulic flow divider.

8. A flow divider comprising:
a body having an inlet to a central chamber in the body;
a first diaphragm separating the central chamber from a first chamber;
a second diaphragm separating the central chamber from a second chamber;
a first cap disposed in the body and forming a wall for the first chamber;
a second cap disposed in the body and forming a wall for the second chamber;
a first outlet disposed through the first cap creating fluid communication from the first chamber;
a second outlet disposed through the second cap creating fluid communication from the second chamber;
a spool disposed through the first diaphragm and the second diaphragm, wherein the spool has a central portion disposed in the central chamber and having at least one inlet to a central cavity, the central cavity has a first orifice in fluid communication with the first chamber through at least one first spool outlet, and the central cavity has a second orifice in fluid communication with the second chamber through at least one second spool outlet, wherein the spool has a first tapered nozzle that reduces in size from the central portion of the spool into the first outlet of the flow divider, and the spool has a second tapered nozzle extending into the second outlet.

9. The flow divider of claim 8, further comprising:
a first spacer positioned between the first diaphragm and the first cap; and
a second spacer positioned between the second diaphragm and the second cap.

10. The flow divider of claim 8, wherein the central portion, the first tapered nozzle and the second tapered nozzle are three separate parts connected to form the spool.

11. The flow divider of claim 8, further comprising:
a first pressure measurement port disposed in the body in pressure communication with the first chamber; and
a second pressure measurement port disposed in the body in pressure communication with the second chamber.

12. The flow divider of claim 8, wherein the flow divider maintains consistent flow to the first and second outlets even when there is downstream backpressure by being able to move away from the outlet with the increased pressure to further drive the opposite nozzle into the other outlet to reduce the flow at the other outlet to balance the pressure at each outlet.

13. The flow divider of claim 8, wherein the spool is suspended with the first and second diaphragms and designed to move within the flow divider without contacting the body.

14. The flow divider of claim 8, wherein the flow divider is designed to operate with a range of fluid viscosities of 0.1 to 2 gallons per minute.

15. The flow divider of claim 8, wherein the flow divider comprises a non-hydraulic flow divider.

16. A flow divider comprising:
a body having an inlet to a central chamber in the body;
a first diaphragm separating the central chamber from a first chamber; and
a spool disposed in the central chamber and extending through the first diaphragm, the spool having an inlet and a first orifice for fluid communication to the first chamber, wherein the first diaphragm forms the first chamber, wherein the spool has a first tapered nozzle that reduces in size from a central portion of the spool into a first outlet of the flow divider.

17. The flow divider of claim 16, wherein the flow divider comprises a non-hydraulic flow divider.

18. The flow divider of claim 16, further comprising:
a second diaphragm separating the central chamber from a second chamber, the spool disposed in the central chamber and extending through the first diaphragm and the second diaphragm, the spool having a second orifice for fluid communication to the second chamber.

19. The flow divider of claim 16, wherein the inlet of the spool comprises a plurality of inlets equally spaced from each other.

20. The flow divider of claim 18, wherein the spool comprises a central cavity that is in fluid communication with first chamber through the first orifice leading to one or more first spool outlets, and the central cavity is in fluid communication with the second chamber through the second orifice leading to one or more second spool outlets.

21. The flow divider of claim 1, further comprising:
over molding to allow the first diaphragm to be permanently connected to the spool to create a strong seal with no screw on parts.

22. The flow divider of claim 1, wherein the first diaphragm defines a wall of the first chamber and the second diaphragm defines a wall of the second chamber.

23. The flow divider of claim 16, wherein the first diaphragm defines a wall of the first chamber.

* * * * *